United States Patent
Christoph et al.

(10) Patent No.: US 9,600,596 B2
(45) Date of Patent: Mar. 21, 2017

(54) PARSER WRAPPER CLASS

(71) Applicants: Björn Christoph, Walldorf (DE); Iwan Zarembo, Walldorf (DE); Iliyan Dimov, Walldorf (DE)

(72) Inventors: Björn Christoph, Walldorf (DE); Iwan Zarembo, Walldorf (DE); Iliyan Dimov, Walldorf (DE)

(73) Assignee: SAP SE, Walldorf (DE)

( * ) Notice: Subject to any disclaimer, the term of this patent is extended or adjusted under 35 U.S.C. 154(b) by 352 days.

(21) Appl. No.: 14/247,886

(22) Filed: Apr. 8, 2014

(65) Prior Publication Data
US 2015/0286746 A1   Oct. 8, 2015

(51) Int. Cl.
G06F 17/22   (2006.01)
G06F 17/30   (2006.01)
G06F 17/27   (2006.01)
G06F 3/038   (2013.01)
G06F 9/54    (2006.01)

(52) U.S. Cl.
CPC ........ G06F 17/30914 (2013.01); G06F 3/038 (2013.01); G06F 9/541 (2013.01); G06F 17/2247 (2013.01); G06F 17/2705 (2013.01)

(58) Field of Classification Search
CPC ........... G06F 17/2705; G06F 17/30914; G06F 3/038; G06F 17/2247; G06F 9/541
See application file for complete search history.

(56) References Cited

U.S. PATENT DOCUMENTS

| | | | |
|---|---|---|---|
| 6,446,256 B1 * | 9/2002 | Hyman | G06F 8/447 707/E17.118 |
| 6,584,508 B1 | 6/2003 | Epstein et al. | |
| 6,587,888 B1 | 7/2003 | Chieu et al. | |
| 6,763,499 B1 * | 7/2004 | Friedman | G06F 17/2247 715/240 |
| 6,925,631 B2 * | 8/2005 | Golden | G06F 17/2247 715/234 |
| 7,065,561 B2 * | 6/2006 | Fry | G06F 17/2247 715/234 |
| 7,146,643 B2 | 12/2006 | Dapp et al. | |
| 7,249,345 B2 * | 7/2007 | Zorc | G06F 8/30 717/106 |
| 7,581,170 B2 * | 8/2009 | Baumgartner | G06F 17/30911 715/234 |
| 7,640,492 B2 * | 12/2009 | Soderberg | G06F 17/2247 715/234 |
| 7,698,398 B1 | 4/2010 | Lai | |

(Continued)

OTHER PUBLICATIONS

Coding from Google for a "SecureGenericXMLFactory", 5 pages, 2013.

*Primary Examiner* — Maikhanh Nguyen
(74) *Attorney, Agent, or Firm* — Mintz Levin Cohn Ferris Glovsky and Popeo, P.C.

(57) ABSTRACT

A system, a method, a device, and a computer program product for parsing a document are provided. A processing instance for parsing by at least one parsing module in a plurality of parsing modules is generated. The generated processing instance is intercepted. Based on the intercepted generated processing instance, a parsing module is selected. Using the selected parsing module, the processing instance is parsed to generate a parsed processing instance.

14 Claims, 7 Drawing Sheets

(56) References Cited

U.S. PATENT DOCUMENTS

| | | | | |
|---|---|---|---|---|
| 7,882,149 | B2* | 2/2011 | Foster | G06F 17/30908 |
| | | | | 715/234 |
| 7,930,630 | B2* | 4/2011 | Masood | G06F 17/2241 |
| | | | | 715/234 |
| 8,037,408 | B2 | 10/2011 | Hartmann | |
| 8,074,160 | B2* | 12/2011 | Fry | G06F 17/2247 |
| | | | | 715/200 |
| 8,104,078 | B2 | 1/2012 | Padmanabhuni et al. | |
| 8,176,413 | B2 | 5/2012 | Marcy et al. | |
| 8,316,443 | B2 | 11/2012 | Rits et al. | |
| 8,397,158 | B1* | 3/2013 | Nethi | G06F 17/272 |
| | | | | 715/234 |
| 8,555,261 | B1* | 10/2013 | Hejlsberg | G06F 17/2247 |
| | | | | 717/142 |
| 8,595,797 | B2 | 11/2013 | Reinertsen | |
| 8,756,252 | B2 | 6/2014 | Krueger | |
| 2003/0159112 | A1* | 8/2003 | Fry | G06F 17/272 |
| | | | | 715/234 |
| 2004/0236715 | A1 | 11/2004 | Krebs | |
| 2005/0044197 | A1* | 2/2005 | Lai | G06Q 10/10 |
| | | | | 709/223 |
| 2005/0246694 | A1* | 11/2005 | Soderberg | G06F 17/2247 |
| | | | | 717/143 |
| 2006/0020951 | A1* | 1/2006 | Fry | G06F 17/2247 |
| | | | | 719/328 |
| 2006/0155725 | A1* | 7/2006 | Foster | G06F 17/30908 |
| 2007/0050707 | A1* | 3/2007 | Liu | G06F 8/37 |
| | | | | 715/234 |
| 2009/0089658 | A1 | 4/2009 | Chiu et al. | |
| 2009/0307229 | A1* | 12/2009 | Kunti | G06F 17/30914 |
| 2010/0083099 | A1* | 4/2010 | Shanmugam | G06Q 10/10 |
| | | | | 715/234 |
| 2011/0029857 | A1* | 2/2011 | Li | G06F 17/2705 |
| | | | | 715/234 |
| 2011/0131273 | A1* | 6/2011 | Merissert-Coffini Res | G06F 8/00 |
| | | | | 709/203 |
| 2014/0165194 | A1 | 6/2014 | Dodd et al. | |

* cited by examiner

PARSER WRAPPER CLASS

TECHNICAL FIELD

This disclosure relates generally to data processing and, in particular, to parser wrapper class objects.

BACKGROUND

Extensible Markup Language ("XML") is a markup language that defines a set of rules for encoding documents in a format that is both human-readable and machine-readable. XML is a textual data format having support via Unicode for the languages of the world. XML can be used for the representation of arbitrary data structures and documents. Various application programming interfaces ("APIs") exist to assist software developers with processing of XML data. Further, various schema systems exist to assist the developers in the definition of XML-based languages. Some of the document formats that use XML syntax include RSS, Atom, SOAP, XHTML, and others. XML is also used for communication protocols by way of Extensible Messaging and Presence Protocol ("XMPP").

Documents to be processed by applications can be stored/exchanged using XML. Applications that use XML documents can choose different XML parsers to retrieve data from the XML document for processing within the application. Each such parser can create a slightly different output. Additionally, definitions can be provided how the parsers should work internally during processing of an XML document, where the definitions can include different attributes, features or calling methods that can trigger various parser settings.

XML documents can be created in various ways, which can make the applications and/or the server(s) on which they are running on vulnerable to attacks through parsers. Such attacks are relatively easy to create and in today's world are being used more and more by attackers. Such attacks often occur by using a Document Type Definition ("DTD"), which may be specified within an XML document. The DTD can be used to declare which elements and references may appear in the document, where and being of which type, allowing also to specify External Entities referencing other uniform resource identifiers ("URIs"). An XML attack can lead to a Denial of Service ("DoS") by causing a high consumption of resources (e.g., memory, CPU usage) on the server for a long period of time done deliberately and with the purpose to block other services from execution, a disclosure of data by retrieving data which normally would not be accessible, a remote system access by opening connections to remote systems, possibly also from a server, breaking of application logic, and/or any other attacks. These attacks can be often referred to as XML External Entity ("XXE") attacks, XML bombs and/or XML injection.

An XML parser by default follows the XML specifications, but cannot provide any means to prevent such attacks. Thus, an application that uses an XML parser must configure the parser in such a way that using the XML services does not pose a threat for the system. Protection is especially required if XML from untrusted sources is to be processed. However, a trusted source also cannot guarantee safety because the trusted source itself can also be attacked and/or manipulated. Thus, application developers must configure the parser to use only that functionality which is absolutely necessary and forbid the potentially dangerous one. As such, conventional systems, which do not perform configuration of parsers, might not be able to protect the parsers and/or applications from attacks.

SUMMARY

In some implementations, the current subject matter relates to a method for parsing of a document (e.g., an XML document). The method can include generating a processing instance for parsing by at least one parsing module in a plurality of parsing modules, intercepting the generated processing instances, selecting, based on the intercepted generated processing instance, at least one parsing module in the plurality of modules, and parsing, using the selected parsing module, the processing instance to generate a parsed processing instance. At least one of the generating, the intercepting, the selecting, and the parsing can be performed on at least one processor of at least one computing system.

In some implementations, the current subject matter can include one or more of the following optional features. In some implementations, the instance can be an extensible markup language (XML) document that can be generated by an application for parsing by at least one XML parser.

In some implementations, a parser wrapper object can intercept the application's instance by receiving the generated XML document. The parser wrapper object can select an appropriate parser by determining at least one XML parser for parsing the XML document based on at least one of the following: a version of the XML parser, at least one attribute of the XML parser, at least one feature of the XML parser, and at least one method of the XML parser.

In some implementations, the XML parser can parse the XML document based on at least one of the following: at least one trusted universal resource identifier associated with at least one external entity identified in the XML document, and a mapping of at least one universal resource identifier to at least another universal resource identifier associated with at least one external entity identified in the XML document. The trusted universal resource identifier and the mapping can be defined by the application.

In some implementations, the XML parser can be associated with at least one entity resolver object for determining, during parsing of the XML document, at least one external entity identified by at least one universal resource identifier contained in the XML document.

In some implementations, the method can further include validating, based on parsing, at least one XML schema definition associated with the parsed XML document.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
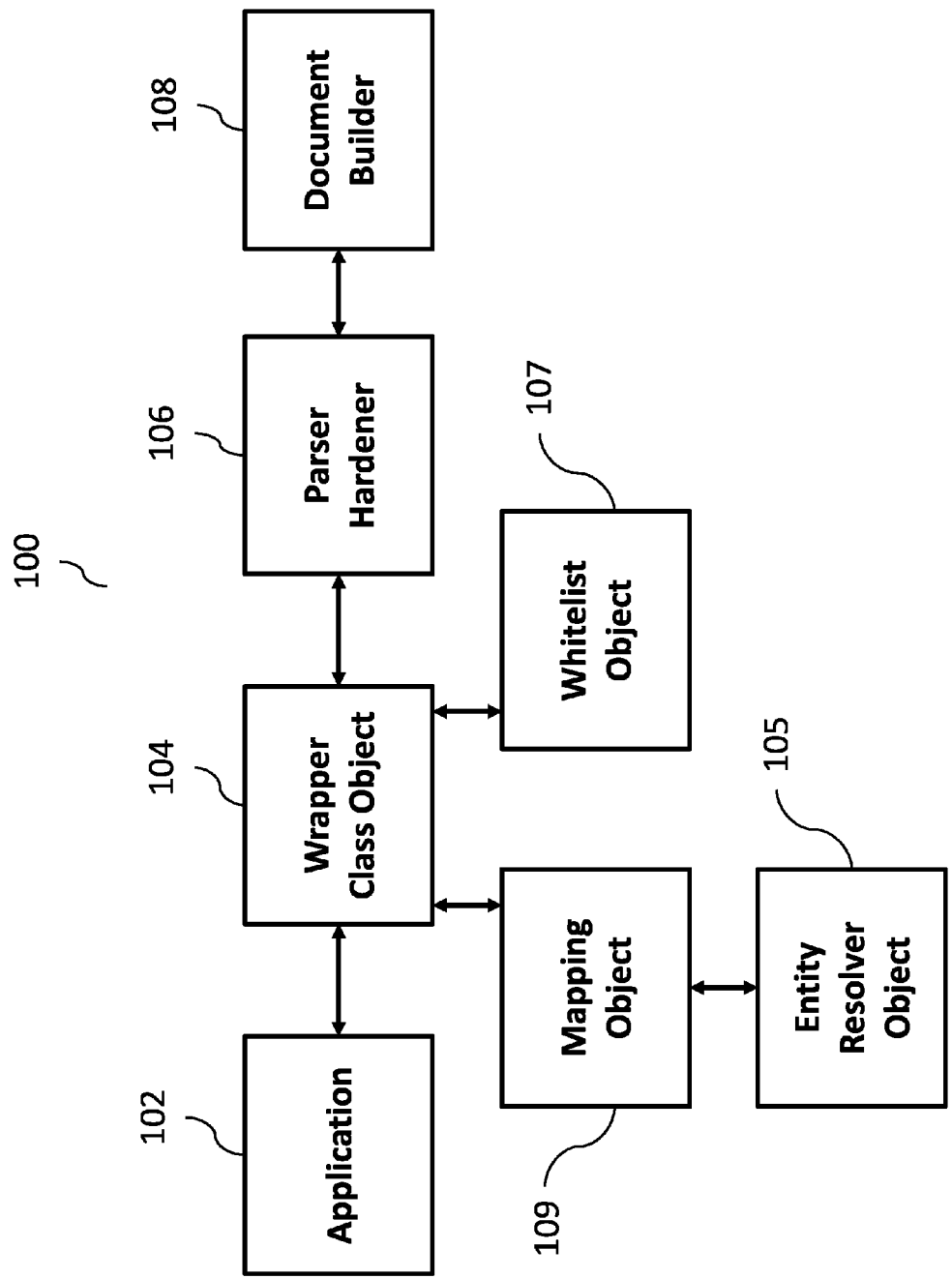
FIG. 1 illustrates an exemplary system for providing protection to document builder and document builder factory classes using a wrapper class object, according to some implementations of the current subject matter.

To address these and potentially other deficiencies of currently available solutions, one or more implementations of the current subject matter provide methods, systems, articles or manufacture, and the like that can, among other possible advantages, provide systems and methods for providing systems, methods, and computer program products for providing an eXtensible Mark-up Language wrapper class to provide protection to applications and/or systems running the applications.

In some implementations, the current subject matter system can be implemented using Java® programming language (Oracle Corporation, Redwood City, Calif., USA). Java programming language can include a plurality of classes. A class is an extensible template for creating objects, providing initial values for state (member variables) and implementations of behavior (member functions, methods). When an object is created by a constructor of the class, the resulting object is called an instance of the class. The member variables specific to the object are called instance variables. Java further includes a plurality of XML application programming interfaces ("Java XML APIs") that provide capabilities of validating and parsing XML documents. Java also includes the following three basic parsing interfaces: document object model parsing interface ("DOM interface"), simple API for XML parsing interface ("SAX interface"), and streaming API for XML ("StAX interface").

The DOM interface parses an entire XML document and constructs a complete in-memory representation of the document using classes to model concepts found in the document object model Level 2 Core Specification. The DOM parser is called a DocumentBuilder and builds an in-memory document representation. The DocumentBuilder creates a tree structure that contains nodes in the XML document, where each tree node in the structure implements a node interface. Different types of tree nodes exist, each representing a type of data found in an XML document, and which include element nodes that may have attributes and text nodes representing the text found between the start and end tags of a document element. The DocumentBuilder further defines the API to obtain DOM document instances from an XML document. Using this class, an application programmer can obtain a document from XML. Further, an instance of this class can be obtained from the DocumentBuilderFactory.newDocumentBuilder( )method. Once an instance of this class is obtained, XML can be parsed from input sources (e.g., InputStreams, Files, URLs, SAX InputSources, etc.).

The DocumentBuilderFactory class defines a factory API that enables applications to obtain a parser that produces DOM object trees from XML documents. For example, the DocumentBuilder parser (represented as javax.xml.parsers.DocumentBuilder) is created by the javax.xml.parsers.DocumentBuilderFactory. Further, at runtime, the DocumentBuilderFactory determines which XML parser implementation will be used for processing. The application itself will (except for SAX parsing) not interact directly with the parser implementation but instead use a defined API, e.g., for changing settings and/or creating entity resolvers, for influencing the execution via configuration of the parser.

In some implementations, the current subject matter system relates to a wrapper class object that can provide protection to DocumentBuilderFactory and DocumentBuilder classes. FIG. 1 illustrates an exemplary system 100 for providing protection to the above classes using a wrapper class object, according to some implementations of the current subject matter. The system 100 can include an application 102, a wrapper class object 104, an entity resolver object 105, a mapping object 109, a white list object 107, a parser hardener 106, and a document builder 108. The application 102 can issue various calls relating to XML document parsing. The wrapper class object 104 can intercept calls to the to the document builder 108 (i.e., DocumentBuilderFactory and DocumentBuilder classes) by hardening the XML parser, thereby providing protection to the classes and preventing the above XML attacks. In some implementations, this wrapper class object 104 might not be an XML parser. The wrapper class object 104 can harden XML parsers and can prevent attacks (e.g., XXE attack, XML bomb, etc.). In some implementations, the wrapper class object 104 can also use the white list object 107 and/or the mapping object 109 along with the entity resolver object 105 to resolve calls to external entities within a document, as discussed below. The white list object 107 can include one or more secure external entities that are allowed to be accessed by the parser during parsing of a document. The mapping object 109 can include one or more acceptable universal resource identifiers to external entities to which are mapped to during parsing of the document instead of the universal resource identifiers contained in the document type definition. In some implementations, it can also be possible to use the entity resolver object 105 without the white list object 107 and the mapping object 109.

In some implementations, the wrapper class object 104 can be imported into the application, and can be integrated into an application code for default usage. Further, the application can provide different ways of how the parser hardener 106 works and can enable various features that are not available in the existing DocumentBuilderFactory class. In some implementations, the wrapper class object 104 can override various methods in the DocumentBuilderFactory class and can allow hardening of the XML parser without further interaction from the application 102. Further, the wrapper class object 104 can override the parsing method of the DocumentBuilder class and can create a default entity resolver, which can prevent external entity attacks.

Figure 2:
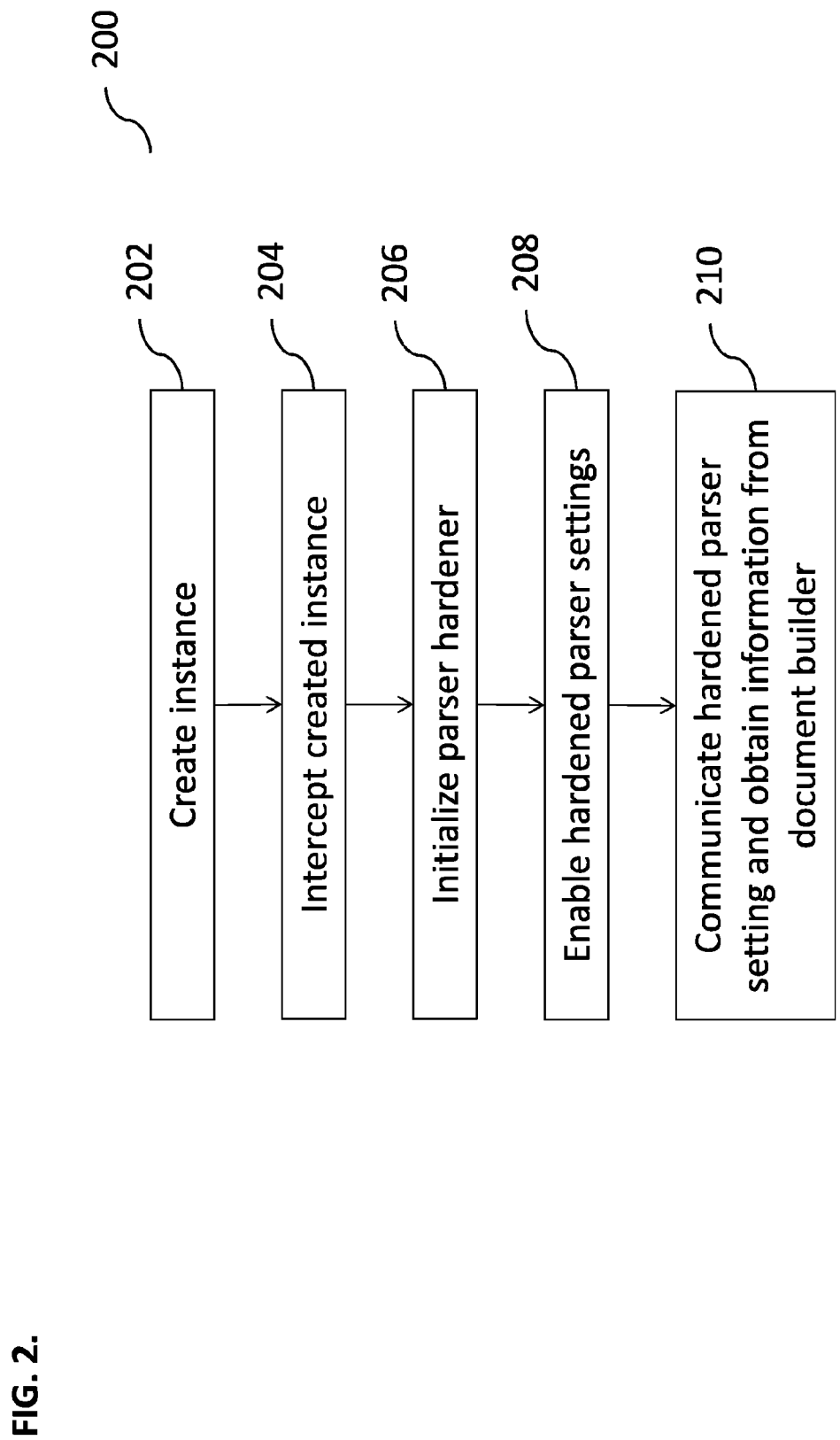
FIG. 2 illustrates an exemplary process for instantiating the wrapper class object, according to some implementations of the current subject matter.

FIG. 2 illustrates an exemplary process for instantiating the wrapper class object 104, according to some implementations of the current subject matter. To instantiate the wrapper class object 104, the application 102 can create an instance (e.g., a process instance, a call, etc.), at 202, and provide it to the wrapper class object 104, which can intercept the created instance prior to it being forwarded to the document builder 108, as 204. The wrapper class object 104 can also initialize the parser hardener 106, at 206. This process involves determination of the parser version, initialization of parser settings (i.e., attributes, features, and methods) that are associated with the specific parser. Once initialization of the parser settings is completed, the wrapper class object 104 can enable the hardened parser settings (i.e., attributes, features, and methods), which cannot be changed, at 208. Based on these hardened settings, the parser hardener 106 can securely communicate the settings to and obtain information from the document builder 108, at 210.

Figure 3:
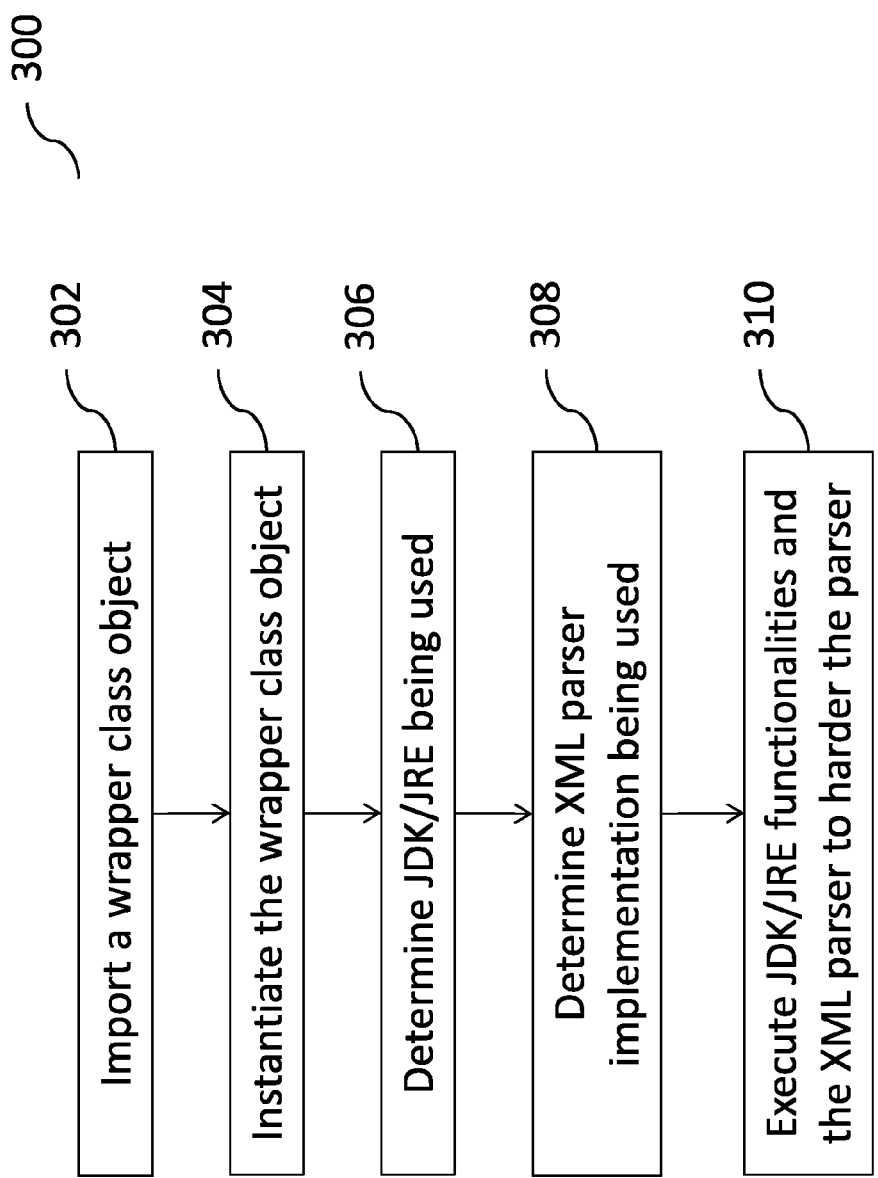
FIG. 3 illustrates an exemplary process for hardening an XML parser, according to some implementations of the current subject matter.

FIG. 3 illustrates an exemplary process 300 for hardening an XML parser, according to some implementations of the current subject matter. At 202, a wrapper class object can be imported. In some implementations, in order to harden the XML parser, the wrapper class object can be imported into the application. This can be achieved by downloading a Java Archive File ("JAR") that can include various Java document files describing the new wrapper class object. In some implementations, the application coding can be changed to include the following code to allow access to constants and the wrapper class object:

import   com.sap.security.xml.SecurityXmlWrapperConstants;
    import  com.sap.security.xml.dom.SapDocumentBuilderFactory;

At 304, the DocumentBuilderFactory instantiation can be replaced with instantiation of the wrapper class object (as discussed above with regard to FIG. 2). Once the instantiation of the DocumentBuilderFactory class is replaced with the instantiation of the wrapper class object, the XML parser can become hardened, thereby securing the DocumentBuilder class and the XML parser from attacks described above. In some implementations, subsequent to the instantiation of the wrapper object class, the following operations can be executed. At 306, a determination can be made which Java development kit ("JDK")/Java runtime environment ("JRE") is being used to determine the available functionality for the Java code. In some implementations, it can be possible, for example, to block execution in specific JDK/JRE implementations in the event of various security issues. In this case, an exception can be thrown, thereby forcing replacement of insecure JDK/JRE with a secure one. At 308, a determination can be made as to which XML parser implementation is being used. At 310, the JDK/JRE functionalities and the XML parsers implementation can be executed. This can be achieved using setAttribute( ) and setFeature( ) methods as well as various calls to parser-specific methods. This can set up an XML parser through the DocumentBuilderFactory thereby preventing the above attacks.

In some implementations, instantiation of the wrapper class object 104 can secure an application and provide additional functionalities by the wrapper class object (e.g., allowing application to conduct XML schema validation after parsing an XML document, using other methods that are not available in the DocumentBuilderFactory: com.sap.security.xml.dom.SapDocumentBuilderFactory.validateXSDSchema(Document, Schema), where the second parameter is the path to the XML schema document ("XSD") to validate against.

In some implementations, the process of XML schema validation can be also triggered during execution of the parsing method (i.e., parse( )) in the DocumentBuilder class. This can eliminate code extensions within an application. Additionally, this can allow maintenance of a list of schemas in the same fashion whenever a hardener class is used. After parsing the document, the DocumentBuilder class can generate a list of available schemas, for example, reading the schemas from a predetermined folder stored in a storage location (which can be based on the namespace of a service). In some implementations, the parse( ) method code can determine which schema is a valid schema for a particular document based on the available schemas. If no valid schema is found to validate the document, an exception can be thrown. In some implementations, the parse( ) method can perform this task, i.e., determine against which files the validation should be performed, in a background. This is advantageous as the parser hardener 106 can perform this task without significantly altering its underlying coding.

In some implementations, the current subject matter system can include a maintenance user interface (not shown in FIG. 1). The user interface can allow, for example, retrieval of a list of all external entities URIs, which have been processed by the entity resolver object 105. This list can include rejected and/or successful URIs. It can also include their usage frequency (e.g., time when URI was first accessed, time when URI was last accessed, how often the URI is/was accessed, etc.). Based on this list, the user interface can allow checking content of a URI, addition of rejected URIs to a white list of URIs, maintenance of a mapper list entry for a URI (optionally, copying the external content to a local copy), etc. In some implementations, the user interface can also maintain a schema file that can be used for validation purposes.

In some implementations, the DocumentBuilderFactory class, upon being initialized, can determine whether it should harden the parser. If there are issues with the hardener (e.g., due to errors in the hardener, application's use of the DocumentBuilderFactory class without having a white list and/or a mapper list defined, etc.), the application can be used as delivered with security features disabled. In some implementations, disabled security features can be detected using a configuration parameter in a file and/or in a database table. If the configuration parameter is enabled and use, then the DocumentBuilderFactory class will not harden the parser, and instead, it can allow for full access to the DocumentBuilderFactory class and can execute only the default parsing and skip any validation, as discussed above.

In some implementations, once the wrapper class object 104 is instantiated, the parser can be set up to prevent XML attacks and an entity resolver object can be initialized. Since XML documents commonly refer to external entities (e.g., public and/or system ID for the document type definition), which are external relationships expressed using universal resource identifiers ("URIs"), entity resolver objects can be used to allow the parser to locate external entities (e.g., DTDs, XML schema documents ("XSD"), etc.).

In some implementations, an entity resolver object can be a callback that can use an identifier in document type declaration to locate a particular entity. If the XML parser finds an entity during parsing of the document, the parser can determine whether the entity resolver has been specified and if so call it.

In some implementations, the entity resolver object can make the application more robust against failures by implementing mapping lists. For example, in parsing a document, an external entity can point to a URI of a network, which can cause an error/failure if the network is not available. The entity resolver implementation can allow the application to continue its execution and parsing of documents by using the mapping list, allowing the parser to retrieve the document from another location.

In some implementations, specific protocols used in the URI can be blocked from usage as they are not used to reduce the attack surface by possibly triggering vulnerabilities in these protocols.

In some implementations, the parser object can use entity resolver object to try to resolve location of entities directly, which means that the parser can try to access everything entered as value using the URL class (all its supported features and protocols). In some implementations, the entity resolvers can also use white list objects 107 of entities and/or entity mapping objects 109 of entities to attempt to resolve an entity during parsing of the document. In some implementations, a white list of entities can include a list of secure URIs of external entities within the DTD that the application has specified and that are allowed to be accessed. In some implementations, the application 102 (as shown in FIG. 1) can define such URIs and no further validation of such URIs is performed.

In some implementations, an entity mapping object 109 can allow the application 102 to specify URIs that can be accepted within the DTD as URIs of external entities but are mapped to different URIs. This can allow the application 102 to accept the incoming URI of "http://www.xyz.com/my.dtd" and replace it with (or map it to) another version, such as, "C:/dtd/xyz_com_my.dtd" (where "C:" can refer to a local storage location). In some implementations, an application can define such mappings of URIs that can correspond to entities and can provide it to the entity resolver object for performing an appropriate mapping. The following command lines are illustrative examples of mappings:

To add a single mapping entry without custom entity resolver (which can be an entity resolver that is specific for a particular application), the following can be used:
   dbf.addEntryToMappingList("URI_IN_DOCUMENT", "REPLACED_URI");

To add multiple mapping entries without custom entity resolver, the following can be used:
   dbf.addEntryToMappingList("URI_IN_DOCUMENT", "REPLACED_URI");
   dbf.addEntryToMappingList("URI_IN_DOCUMENT2", "REPLACED_URI2");

To set a map of entity mappings, the following can be used:
   Map<String, String> mapList=new HashMap<String, String>( );
   mapList.put("URI_IN_DOCUMENT", "REPLACED_URI");
   mapList.put("URI_IN_DOCUMENT2", "REPLACED_URI2");
   dbf.setMapping(mapList);

To add a mapping entry with a single entity resolver, the following can be used:
   dbf.addEntryToMappingList("URI_IN_DOCUMENT", "REPLACED_URI",customEntityResolver);

To add a mapping entry with a list of entity resolvers of type List<EntityResolver>, the following can be used:
   dbfaddEntryToMappingList("URI_IN_DOCUMENT", "REPLACED_URI", customEntityResolverList);

In some implementations, the entity resolver object can generate an exception if an external entity is used within a DTD that does not have a valid URI (e.g., an exception can be generated based on a white list object 107 and/or an entity mapping object 109, as discussed below). Additionally, the parser wrapper object 104 implementing an entity resolver object 105 can disable changing of any settings (i.e., attributes, features, and methods) of the DocumentBuilderFactory. Thus, the parser wrapper object 104 can also prevent the application 102 from altering any settings (i.e., attributes, features, and methods) of the document builder 108. An exception can be generated if the application 102 attempts to do so.

Figure 4:
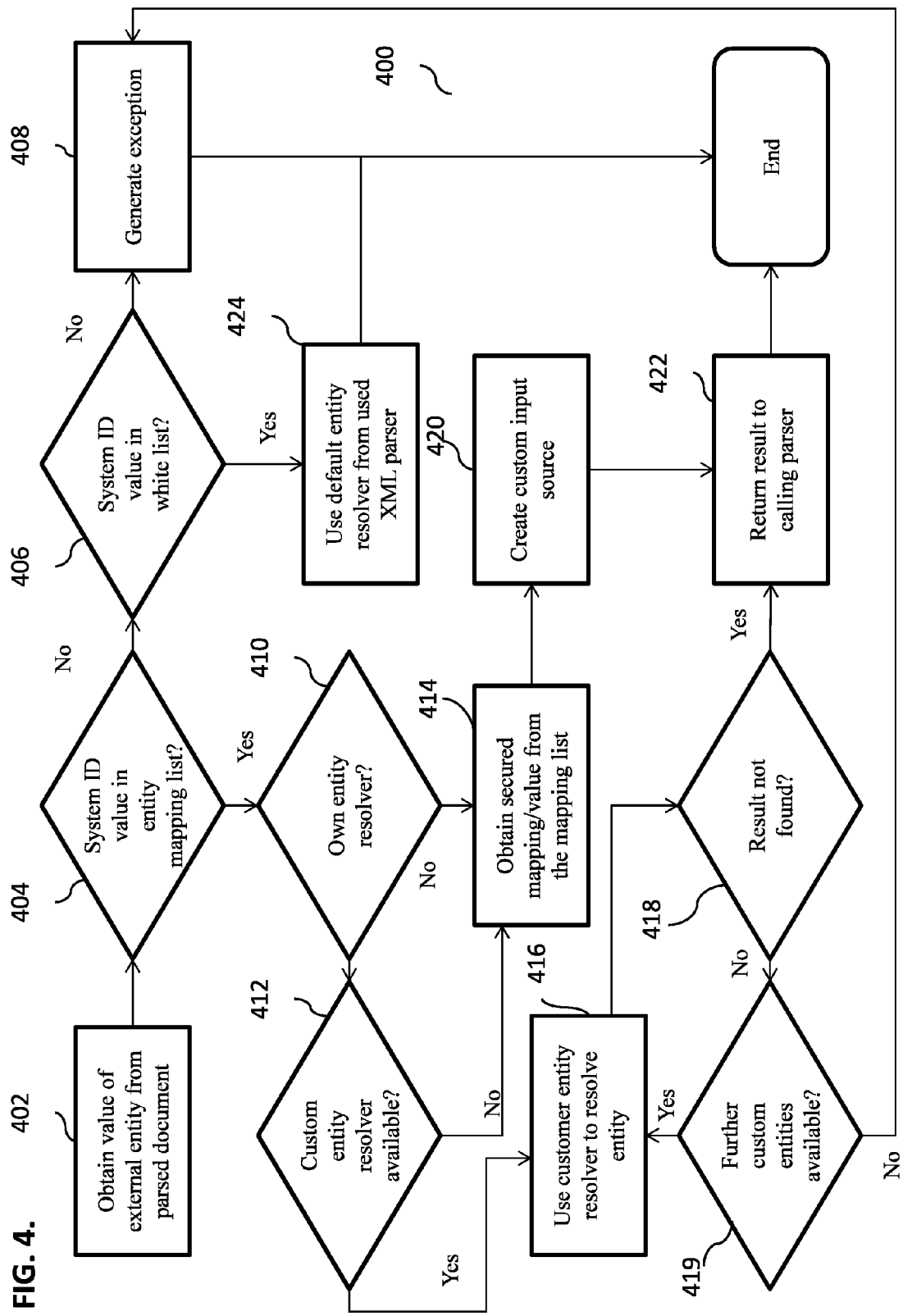
FIG. 4 illustrates an exemplary process performed by an entity resolver implemented by the parser wrapper object, according to some implementations of the current subject matter.

FIG. 4 illustrates an exemplary process 400 performed by an entity resolver implemented by the parser wrapper object, according to some implementations of the current subject matter. At 402, a value of external entity can be obtained from the parsed XML document. Once the value of the external entity is obtained, a system identifier ("system ID") corresponding to external entity can be ascertained. The entity resolver can then determine whether or not the system ID is in the entity mapping list that has been defined by the application, at 404. If it is, then a determination can be made whether or not the application has its own entity resolver, at 410. If so, then a determination can be made whether or not the application's entity resolver is a custom entity resolver (e.g., specific to that particular application), at 412, and if that is the case, the custom entity resolver is used to attempt to resolve the entity URI using the value from the mapping list, at 416. If the result of the use of the customer entity resolver is found (at 418), the result can be returned to the calling parser object, at 422, and the process ends. Otherwise, the process can check whether further custom entities are available, at 419. If there are, the process 400 can continue until a non-null result is obtained, otherwise an exception, at 408, can be generated, and the process can terminate.

If the custom entity resolver is not available (at 412) or if the application does not have its own entity resolver, at 410, then the mapping list can be used to obtain an appropriate secured mapping/value from the mapping list for the entity, at 414, and a custom input source can be created, at 420, and the mapped value can be used directly without using any further entity resolvers. The result can be returned to the calling parser, at 422.

If the system ID is not present in the mapping list, at 404, then the white list defined by the application can be checked to determine whether the system ID is present there, at 406. If it is, then a default entity resolver from the currently used XML parser taken to resolve the entity can be used, at 424, and, after that, the process can end. Otherwise, an exception can be generated, at 408, and the process can terminate.

In some implementations, the current subject matter can perform XML validation process after parsing. XML validation is a process of checking whether a document written in XML follows a defined structure (i.e., the document is "well informed" and "valid"). A well-formed document follows the basic syntactic rules of XML, which are the same for all XML documents. A valid document also follows the rules of a particular DTD and/or XML schema associated with an application.

Figure 5:
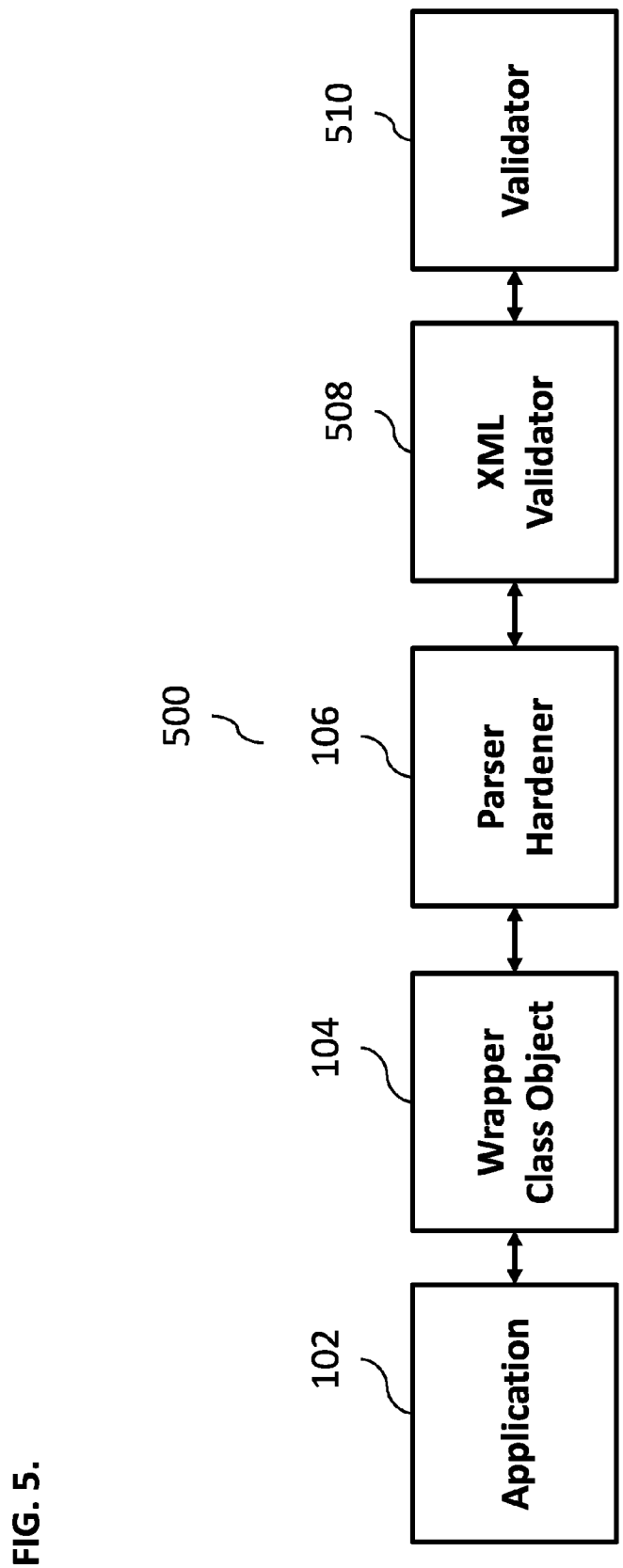
FIG. 5 illustrates an exemplary system for performing validation of an XML document, according to some implementations of the current subject matter.

FIG. 5 illustrates an exemplary system 500 for performing validation of an XML document, according to some implementations of the current subject matter. For the purposes of performing the validation process, a validation class can be defined. This validation class can be used to perform validation of the XML document against a specified validation class schema (e.g., an XML schema definition ("XSD")). Using the validation class schema, the application 102 or the before mentioned parsing method, as discussed above, can determine whether the XML document is valid or not. If it is not valid, the application 102 can determine whether or not to stop further processing.

In order to validate the document within the wrapper class object 104, the application 102 can determine that validation of the XML document is possible by issuing a call to determine whether a particular validation schema is supported (e.g., a method isXSDSchemaValidationSupported( )). If it is supported, then the application 102 can issue further calls (e.g., validateXSDSchema( ) method), which can be executed by specifying the appropriate XSD files. The validation of the XSD schema is performed by the wrapper class object 104 which calls the parser hardener 106, which can obtain supported XML validator 508 and can use a validator 510 from the current parser. The validators can validate a document against a specified schema. In some implementations, an application can determine whether a document is valid and if not can determine whether to stop further processing. To use validation within the DocumentBuilderFactory class, the application can initially check whether validation is possible by calling isXSDSchemaValidationSupported( ) method. If validation is supported, then a call to validateXSDSchema( ) method can be executed by specifying particular XSD files.

Figure 6:
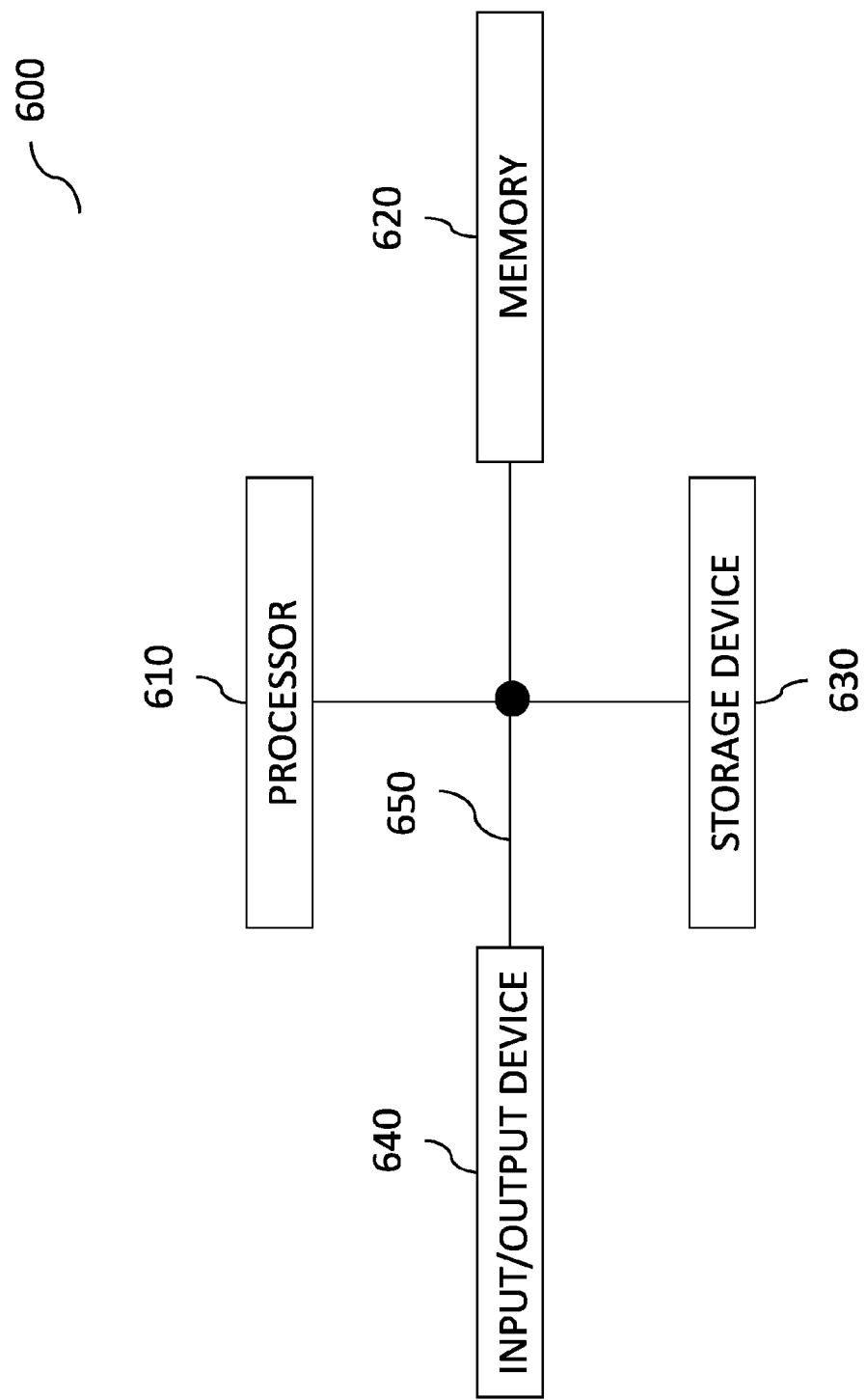
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device.

In alternate implementations, the input/output device 640 can include a display unit for displaying graphical user interfaces.

Figure 7:
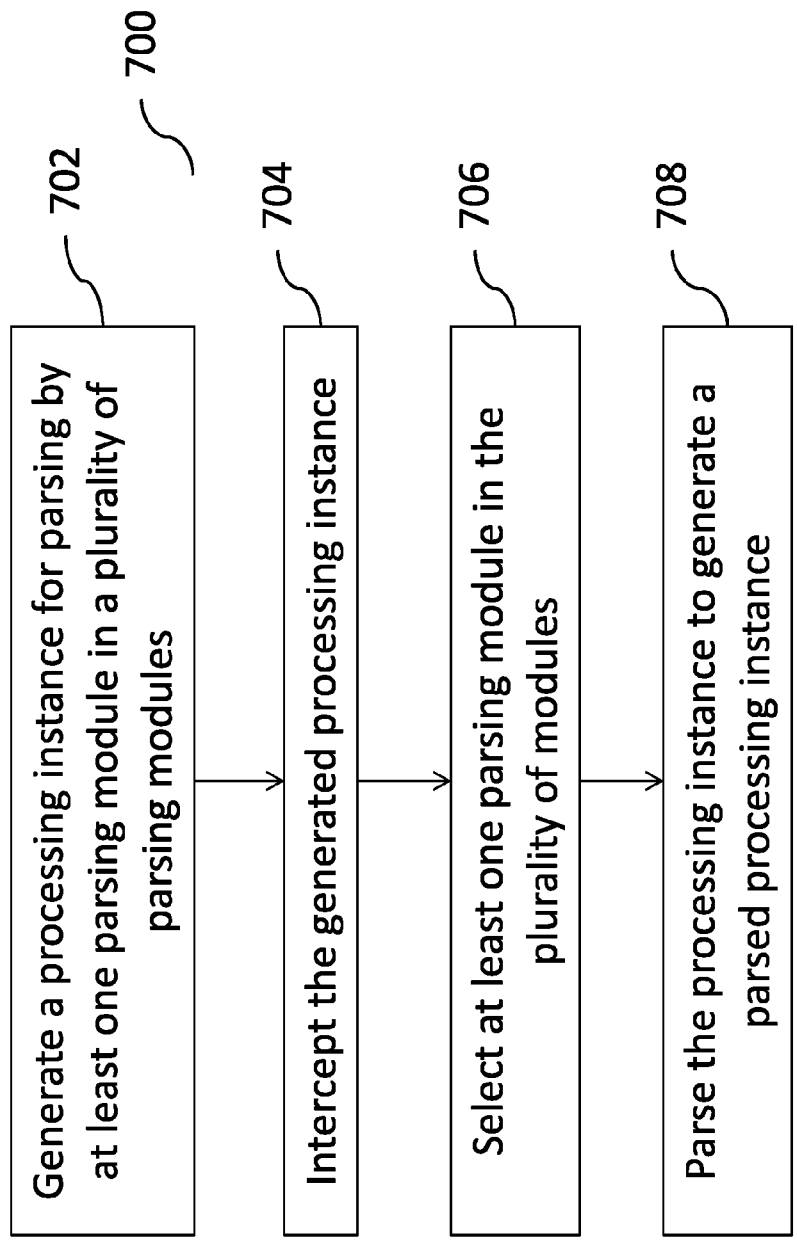
FIG. 7 is an exemplary method, according to some implementations of the current subject matter.

FIG. 7 illustrates an exemplary method for parsing of a document (e.g., an XML document), according to some implementations of the current subject matter. At 702, a processing instance for parsing by at least one parsing module in a plurality of parsing modules can be generated. At 704, the generated processing instance can be intercepted. At 706, based on the intercepted generated processing instance, at least one parsing module in the plurality of modules can be selected. At 708, using the selected parsing module, the processing instance can be parsed to generate a parsed processing instance. At least one of the generating, the intercepting, the selecting, and the parsing can be performed on at least one processor of at least one computing system.

In some implementations, the current subject matter can include one or more of the following optional features. In some implementations, the instance can be an extensible markup language (XML) document that can be generated by an application for parsing by at least one XML parser.

In some implementations, a parser wrapper object can intercept the application's instance by receiving the generated XML document. The parser wrapper object can select an appropriate parser by determining at least one XML parser for parsing the XML document based on at least one of the following: a version of the XML parser, at least one attribute of the XML parser, at least one feature of the XML parser, and at least one method of the XML parser.

In some implementations, the XML parser can parse the XML document based on at least one of the following: at least one trusted universal resource identifier associated with at least one external entity identified in the XML document, and a mapping of at least one universal resource identifier to at least another universal resource identifier associated with at least one external entity identified in the XML document. The trusted universal resource identifier and the mapping can be defined by the application.

In some implementations, the XML parser can be associated with at least one entity resolver object for determining, during parsing of the XML document, at least one external entity identified by at least one universal resource identifier contained in the XML document.

In some implementations, the method can further include validating, based on parsing, at least one XML schema definition associated with the parsed XML document.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:
1. A computer-implemented method, comprising:
generating a processing instance for parsing by at least one parsing module in a plurality of parsing modules;
intercepting, using at least one parser wrapper class object, the generated processing instance, the at least one parser wrapper class object providing protection to at least one class object including at least one application programming interface for obtaining at least one parsing module for generating at least one document object model tree, the at least one parser wrapper class object verifying the at least one parsing module based on a predetermined list of parsing modules;
selecting, based on the intercepted generated processing instance, the at least one parsing module in the plurality of modules;
hardening the at least one selected parsing module using at least one hardened parser setting that cannot be changed; and
parsing, using the hardened parsing module, the processing instance to generate a parsed processing instances;

wherein the generating further comprises generating, using at least one application, an extensible markup language (XML) document for parsing by at least one XML parser,
wherein the XML parser is associated with at least one entity resolver object for determining, during parsing of the XML document, at least one external entity identified by at least one universal resource identifier contained in the XML document; and
wherein the at least one of the generating, the intercepting, the selecting, the hardening, and the parsing is performed on at least one processor of at least one computing system.

2. The method according to claim 1, wherein the intercepting further comprises
receiving, using at least one parser wrapper object, the generated XML document.

3. The method according to claim 2, wherein the selecting further comprises determining, using the at least one parser wrapper object, the at least one XML parser for parsing the XML document based on at least one of the following: a version of the at least one XML parser, at least one attribute of the at least one XML parser, at least one feature of the at least one XML parser, and at least one method of the at least one XML parser.

4. The method according to claim 1, wherein the at least one XML parser parses the XML document based on at least one of the following: at least one trusted universal resource identifier associated with at least one external entity identified in the XML document, and a mapping of at least one universal resource identifier to at least another universal resource identifier associated with at least one external entity identified in the XML document, wherein the at least one trusted universal resource identifier and the mapping are defined by the at least one application.

5. The method according to claim 1, further comprising validating, based on parsing, at least one XML schema definition associated with the parsed XML document.

6. A system comprising:
at least one programmable processor; and
a machine-readable medium storing instructions that, when executed by the at least one programmable processor, cause the at least one programmable processor to perform operations comprising:
generating a processing instance for parsing by at least one parsing module in a plurality of parsing modules;
intercepting, using at least one parser wrapper class object, the generated processing instance, the at least one parser wrapper class object providing protection to at least one class object including at least one application programming interface for obtaining at least one parsing module for generating at least one document object model tree, the at least one parser wrapper class object verifying the at least one parsing module based on a predetermined list of parsing modules;
selecting, based on the intercepted generated processing instance, the at least one parsing module in the plurality of modules;
hardening the at least one selected parsing module using at least one hardened parser setting that cannot be changed; and
parsing, using the hardened parsing module, the processing instance to generate a parsed processing instance;
wherein the generating further comprises generating, using at least one application, an extensible markup language (XML) document for parsing by at least one XML parser; and
wherein the XML parser is associated with at least one entity resolver object for determining, during parsing of the XML document, at least one external entity identified by at least one universal resource identifier contained in the XML document.

7. The system according to claim 6, wherein the intercepting further comprises
receiving, using at least one parser wrapper object, the generated XML document.

8. The system according to claim 7, wherein the selecting further comprises determining, using the at least one parser wrapper object, the at least one XML parser for parsing the XML document based on at least one of the following: a version of the at least one XML parser, at least one attribute of the at least one XML parser, at least one feature of the at least one XML parser, and at least one method of the at least one XML parser.

9. The system according to claim 6, wherein the at least one XML parser parses the XML document based on at least one of the following: at least one trusted universal resource identifier associated with at least one external entity identified in the XML document, and a mapping of at least one universal resource identifier to at least another universal resource identifier associated with at least one external entity identified in the XML document, wherein the at least one trusted universal resource identifier and the mapping are defined by the at least one application.

10. The system according to claim 6, wherein the operations further comprise
validating, based on parsing, at least one XML schema definition associated with the parsed XML document.

11. A computer program product comprising a non-transitory machine-readable medium storing instructions that, when executed by at least one programmable processor, cause the at least one programmable processor to perform operations comprising:
generating a processing instance for parsing by at least one parsing module in a plurality of parsing modules;
intercepting, using at least one parser wrapper class object, the generated processing instance, the at least one parser wrapper class object providing protection to at least one class object including at least one application programming interface for obtaining at least one parsing module for generating at least one document object model tree, the at least one parser wrapper class object verifying the at least one parsing module based on a predetermined list of parsing modules;
selecting, based on the intercepted generated processing instance, the at least one parsing module in the plurality of modules;
hardening the at least one selected parsing module using at least one hardened parser setting that cannot be changed; and
parsing, using the hardened parsing module, the processing instance to generate a parsed processing instances;
wherein the generating further comprises generating, using at least one application, an extensible markup language (XML) document for parsing by at least one XML parser; and
wherein the XML parser is associated with at least one entity resolver object for determining, during parsing of the XML document, at least one external entity identified by at least one universal resource identifier contained in the XML document.

12. The computer program product according to claim 11, wherein the intercepting further comprises receiving, using at least one parser wrapper object, the generated XML document.

13. The computer program product according to claim 12, wherein the selecting further comprises determining, using the at least one parser wrapper object, the at least one XML parser for parsing the XML document based on at least one of the following: a version of the at least one XML parser, at least one attribute of the at least one XML parser, at least one feature of the at least one XML parser, and at least one method of the at least one XML parser.

14. The computer program product according to claim 11, wherein the at least one XML parser parses the XML document based on at least one of the following: at least one trusted universal resource identifier associated with at least one external entity identified in the XML document, and a mapping of at least one universal resource identifier to at least another universal resource identifier associated with at least one external entity identified in the XML document, wherein the at least one trusted universal resource identifier and the mapping are defined by the at least one application.

\* \* \* \* \*